United States Patent [19]

Yanagihara et al.

[11] Patent Number: 5,684,917
[45] Date of Patent: Nov. 4, 1997

[54] APPARATUS AND METHOD FOR RECORDING AND REPRODUCING DIGITAL VIDEO DATA IN A VARIABLE-SPEED MODE

[75] Inventors: Naofumi Yanagihara; Ching Fang Chang, both of Tokyo, Japan

[73] Assignee: Sony Corporation, Tokyo, Japan

[21] Appl. No.: 327,370

[22] Filed: Oct. 21, 1994

[30] Foreign Application Priority Data

Oct. 22, 1993 [JP] Japan .................................. 5-287702
Mar. 30, 1994 [JP] Japan .................................. 6-084090

[51] Int. Cl.$^6$ ................................................ H04N 5/91
[52] U.S. Cl. .................. 386/80; 386/81; 386/111; 386/124; 360/8
[58] Field of Search .................. 360/10.1, 8; 358/312, 358/335; 386/6, 7, 8, 33, 68, 69, 111, 112; H04N 5/92, 9/79, 5/76, 5/91

[56] References Cited

U.S. PATENT DOCUMENTS

| | | | |
|---|---|---|---|
| 4,656,527 | 4/1987 | Uchimi | 358/320 |
| 5,175,631 | 12/1992 | Juri et al. | 358/335 |
| 5,282,049 | 1/1994 | Hatakenaka et al. | 358/335 |
| 5,287,196 | 2/1994 | Yamashita et al. | 358/320 |
| 5,355,229 | 10/1994 | Arano et al. | 358/343 |

FOREIGN PATENT DOCUMENTS

| | | |
|---|---|---|
| 0 505 985 | 9/1992 | European Pat. Off. . |
| 0 553 949 | 8/1993 | European Pat. Off. . |
| WO 94/17631 | 8/1994 | WIPO . |

OTHER PUBLICATIONS

IEEE Transactions on Consumer Electronics, vol. 39, No. 3, Aug. 1993 New York US, pp. 186–191, Boyce et al. 'fast scan technology for digital video tape recorders' paragraph 3.0 paragraph 7.0; figures 2–6.

*Primary Examiner*—Tommy P. Chin
*Assistant Examiner*—Y. Lee
*Attorney, Agent, or Firm*—William S. Frommer; Alvin Sinderbrand

[57] ABSTRACT

Digital video tape recorder which operates to receive an advanced television (ATV) signal to be recorded, provide a portion such as a low-band coefficient of an intra-coded frame of the ATV signal as variable-speed data, and record the digital video data and the variable-speed data in a main and a marginal area, respectively, of successive tracks on the record medium in which the marginal area is located on each track at a position which is reproducible in a fast-speed reproducing mode. The digital video tape recorder reproduces the recorded data in the fast-speed reproducing mode by reproducing the portion of the signal stored from the marginal area of each track which is located at specific reproducible areas.

22 Claims, 21 Drawing Sheets

Fig. 2 RELATED ART
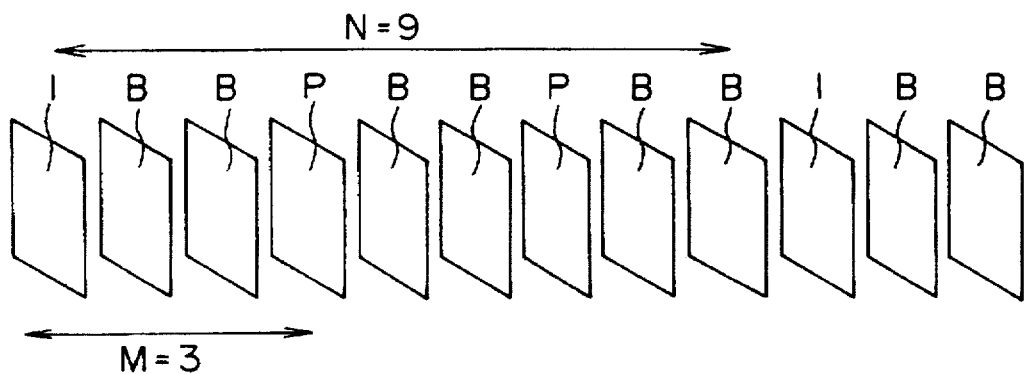
Fig. 3A, Fig. 3B RELATED ART
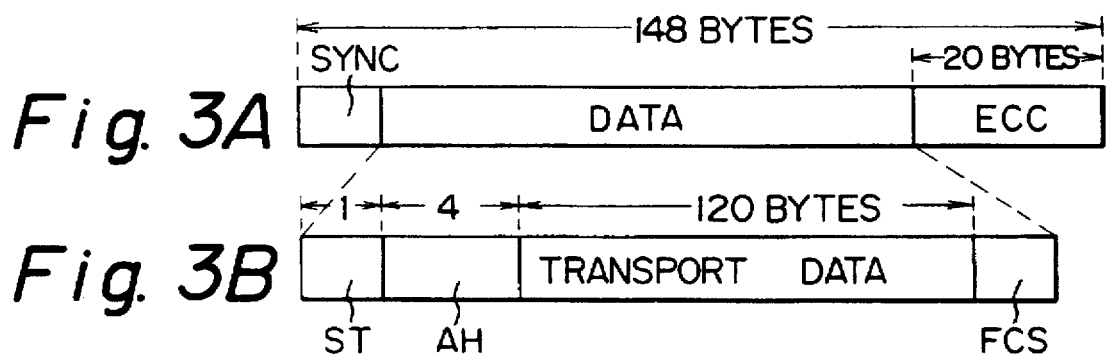
Fig. 4 RELATED ART
| SERVICE TYPE (ST) (1 BYTE) |||||||| 
|---|---|---|---|---|---|---|---|
| P | ID ||| CC ||||
| b7 | b6 | b5 | b4 | b3 | b2 | b1 | b0 |
HP/SP PRIORITY

Fig. 5A RELATED ART

| START POINT OF SLICE | FRAME TYPE | FRAME NUMBER | SLICE NUMBER IN THE FRAME | Q FACTOR |
|---|---|---|---|---|
| 10 BITS | 2 BITS | 5 BITS | 10 BITS | 5 BITS |

AH HEADER

Fig. 5B RELATED ART

| START POINT OF MACRO BLOCK | FRAME TYPE | FRAME NUMBER | MACRO BLOCK NUMBER IN THE FRAME | RSD |
|---|---|---|---|---|
| 10 BITS | 2 BITS | 5 BITS | 13 BITS | 2 BITS |

AH HEADER

HEAD A

| DRUM CONFIGURATION | MAXIMUM TAPE SPEED (EX.17) | |
|---|---|---|
| | FORWARD | REVERSE |
| 2 HEADS (180 deg.) / 9000 rpm | 1.5, 2.5,..., N+0.5 AND 2N+1 | -1.5,-2.5,..,-(N+0.5) AND -(2N-1) |
| A PAIR OF DOUBLE-AZIMATH HEAD / 9000 rpm | 1.5, 2.5,..., N+0.5 AND 2N+1 | -1.5,-2.5,..,-(N+0.5) AND -(2N-1) |
| TWO PAIRS OF DOUBLE-AZIMATH HEADS / 4500 rpm | 1.5, 2.5,..., N+0.5 | -1.5,-2.5,..,-(N+0.5) |

Fig. 28A

| TRACK (N=EVEN NUMBER): | 0 | 1 | 2 | 3 | 4 | 5 |
|---|---|---|---|---|---|---|
| TRICK PLAY AREA NO. | 27-30 | 50-53 | 73-76 | 97-99 | 120-123 | 143-146 |
| SB NO. | | | | | | |

Fig. 28B

| TRACK (N=ODD NUMBER): | 0 | 1 | 2 | 3 | 4 | 5 |
|---|---|---|---|---|---|---|
| TRICK PLAY AREA NO. | 22-25 | 45-48 | 68-71 | 92-94 | 115-118 | 138-141 |
| SB NO. | | | | | | |

Fig. 29

| DRUM CONFIGURATION | FORWARD | REVERSE |
|---|---|---|
| 2 HEADS (180 deg.) / 9000rpm | 1.5X, 2.5X,..., 8.5X AND 17X | -1.5X, -2.5X,..., -8.5X AND -15X |
| A PAIR OF DOUBLE-AZIMATH HEAD / 9000rpm | 1.5X, 2.5X,..., 8.5X AND 17X | -1.5X, -2.5X,..., -8.5X AND -15X |
| TWO PAIRS OF DOUBLE-AZIMATH HEADS / 4500rpm | 1.5X, 2.5X,..., 8.5X | -1.5X, -2.5X,..., -8.5X |

APPARATUS AND METHOD FOR RECORDING AND REPRODUCING DIGITAL VIDEO DATA IN A VARIABLE-SPEED MODE

BACKGROUND OF THE INVENTION

The present invention relates to a digital video tape recorder and, more particularly, to apparatus and method for recording and reproducing high priority digital video data of an advanced television (ATV) signal in areas of a track which are reproduced in high-speed reproducing modes.

Existing analog video recorders record analog video signals on a magnetic medium generally in non-compressed form since their bandwidths are quite narrow. In addition to recording and reproducing video signals, current analog video recorders are operable to reproduce the stored video signals in a high-speed search mode, whereat the magnetic tape medium is transported at a greater speed than the speed at which the tape is transported during normal reproduction. Since positions on each recording track on the magnetic tape medium correspond to positions in a video image, partial scannings of a multiple number of tracks produce sufficient information to produce a recognizable, albeit, poor image.

Digital video recorders, such as digital VTRs, have been developed for recording a video signal in digitized form on a magnetic medium. However, since the bandwidth of a digital video signal is quite wide, it is difficult to record a digital video signal directly on a video tape. Hence, techniques have been proposed for encoding the digital video signal in a manner which reduces its bandwidth. So-called compression encoding techniques include the orthogonal transformation and variable length encoding of the digital video signal; and one highly efficient encoding technique utilizes discrete cosine transformation, or DCT. Compression encoding is further described in U.S. Pat. Nos. 5,321, 440 and 5,346,310, and U.S. patent application Ser. No. 07/967,015, the disclosure of which are incorporated herein by reference.

Digital VTRs which utilize compression encoding techniques to reduce the bandwidth of television signals, e.g., NTSC signals or HDTV signals, prior to recording also decompress or decode reproduced signals so as to return the compressed television signals to their original non-compressed form. One efficient compression technique is to combine the above-mentioned DCT with motion compensation, which utilizes both intraframe coding and interframe coding of the video signal. However, and in contrast to high-speed reproduction of analog signals by an analog video recorder, digital VTRs may not simply scan the tracks on a magnetic tape while transporting it at a greater speed to produce high-speed reproduced images since DCT and interframe decompression techniques require a substantial part, if not all of the data on each track to be reproduced in order to produce stable video images. For example, positions of discrete cosine transformed digital video data do not coincide with positions in a video image, and thus, scanning a different portion of a multiple number of tracks will not produce data pertaining to respectively different portions of an image. In addition, an image, or a portion of an image, may not be produced from the reproduction of a track (or a portion of that track) in which interframe coded data is stored since such data has meaning only with respect to previously stored intraframe or interframe coded data, and since only a portion of each track is reproduced, only a portion of an image, at best, may be produced.

OBJECTS OF THE INVENTION

Therefore, it is an object of the present invention to provide apparatus and method for recording and reproducing digital video data which overcomes the shortcomings of the above described devices.

Another object of the present invention is to provide apparatus and method for recording and reproducing digital video data which provides high-quality images in a high-speed reproducing mode.

A further object of the present invention is to provide apparatus and method which reproduces high-quality images in a high-speed reproducing mode in which the magnetic tape medium may be transported at several different speeds.

An additional object of this invention is to provide apparatus and method for recording and reproducing an advanced television (ATV) signal which reproduces high-quality images at variable tape speeds.

Still another object of the present invention is to provide apparatus for recording digital data on a magnetic tape medium which is reproducible at high tape speeds from a reproducing apparatus having different recording/reproducing head configurations.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method for recording digital video data on a record medium which operates to receive digital video data (e.g., an advanced television (ATV) signal), provide a portion of the digital video data as variable-speed data (e.g., the low band coefficient of the intra-coded frame data of the digital video data), and record the digital video data and the variable-speed data in a main and a marginal area, respectively, of successive tracks on the record medium on which the marginal area is located on each track at a position which is reproducible in a fast-speed reproducing mode.

As one aspect of the present invention, the marginal area includes trick-play areas for storing the variable-speed data therein and which are located on each track at positions which may be helically scanned during reproducing in the fast-speed reproducing mode such that at least one trick-play area of each track is reproduced.

As another aspect of this invention, the same portion of the variable-speed data is recorded in respective trick-play areas of the marginal area on each of M tracks (e.g., which have the same azimuth) such that substantially every portion of the variable-speed data is reproduced after one helical scan of the tracks when reproducing in the fast-speed reproducing mode.

In accordance with another embodiment of the present invention, apparatus and method for reproducing digital video data from successive tracks on a record medium which operates to transport the record medium in a standard reproducing mode and in a fast speed reproducing mode, reproduce digital video data (e.g., an advanced television (ATV) signal) and variable-speed data (e.g., the low band coefficient of the intra-coded frame data of the digital video data) from main and marginal areas, respectively, of each track in the standard reproducing mode, and reproduce the variable-speed data from the marginal area of each track in the fast-speed reproducing mode, and supply the digital video data as an output in the standard reproducing mode, and supply the variable-speed data as the output in the fast-speed reproducing mode.

As one aspect of the present invention, substantially every portion of the variable-speed data is reproduced by scanning in one scan pass the tracks (e.g. having the same azimuth) in the fast-speed reproducing mode.

As another aspect of this invention, substantially every portion of the variable-speed data is reproduced in two helical scan passes of the tracks in a variable-speed mode in which the tape is being transported at a speed 0.5+L, where L equals 1 to (M−1)/2 and M is the maximum tape reproducing speed.

As yet a further aspect of this invention, substantially every portion of the variable-speed data is reproduced in one scan pass of the tracks at a reverse tape speed M−2, where M equals the maximum tape reproducing speed.

BRIEF DESCRIPTION OF THE DRAWINGS

The following detailed description, given byway of example and not intended to limit the present invention solely thereto, will best be appreciated in conjunction with the accompanying drawings, wherein like reference numerals denote like elements and parts, in which:

FIG. 2 is a schematic diagram of an example of the intra/inter code format of a coded digital video signal;

FIGS. 3A and 3B are schematic representations of the data structure of a packet of an advanced television signal;

FIG. 4 is a schematic representation of the data structure of the service type data in the packet illustrated in FIG. 3B;

FIGS. 5A and 5B are schematic representations of the data structure of AH headers in the packet illustrated in FIG. 3B;

FIGS. 15A to 15F are schematic illustrations of reproduced signals at different variable speeds;

FIG. 26 is a chart indicating possible forward and reverse tape reproducing speeds by digital VTRs having different drum arrangements in accordance with the present invention;

FIGS. 28A and 28B are charts indicating the locations of the trick-play areas on each track;

FIG. 29 is another chart indicating possible forward and reverse tape reproducing speeds by a digital VTRs having different drum arrangements in accordance with the present invention;

DETAILED DESCRIPTION OF CERTAIN PREFERRED EMBODIMENTS

As previously discussed, NTSC television signals and HDTV (high definition television) signals are compressed and recorded onto a magnetic tape by a digital video tape recorder. Since NTSC and HDTV signals are generally transmitted in uncompressed form, the digital video tape recorder must compress the received signals prior to recording them. Typically, NTSC signals are compressed to a data width of approximately 25 Mbps (million bits per second) in a standard definition (SD) mode and HDTV signals are compressed to a data width of approximately 50 Mbps in a high definition (HD) mode.

An advanced television (ATV) transmission system is a complete digital compression system which transmits a compressed television signal which may be directly recorded onto a magnetic tape by a digital video tape recorder. Since the digital VTR does not have to compress the transmitted signal, compression circuitry and software is not needed. The ATV transmission system transmits an HDTV signal in the form of compressed "packets" of information whose image compression is based on the MPEG (Moving Picture Experts Group) standard for motion images.

Figure 1:
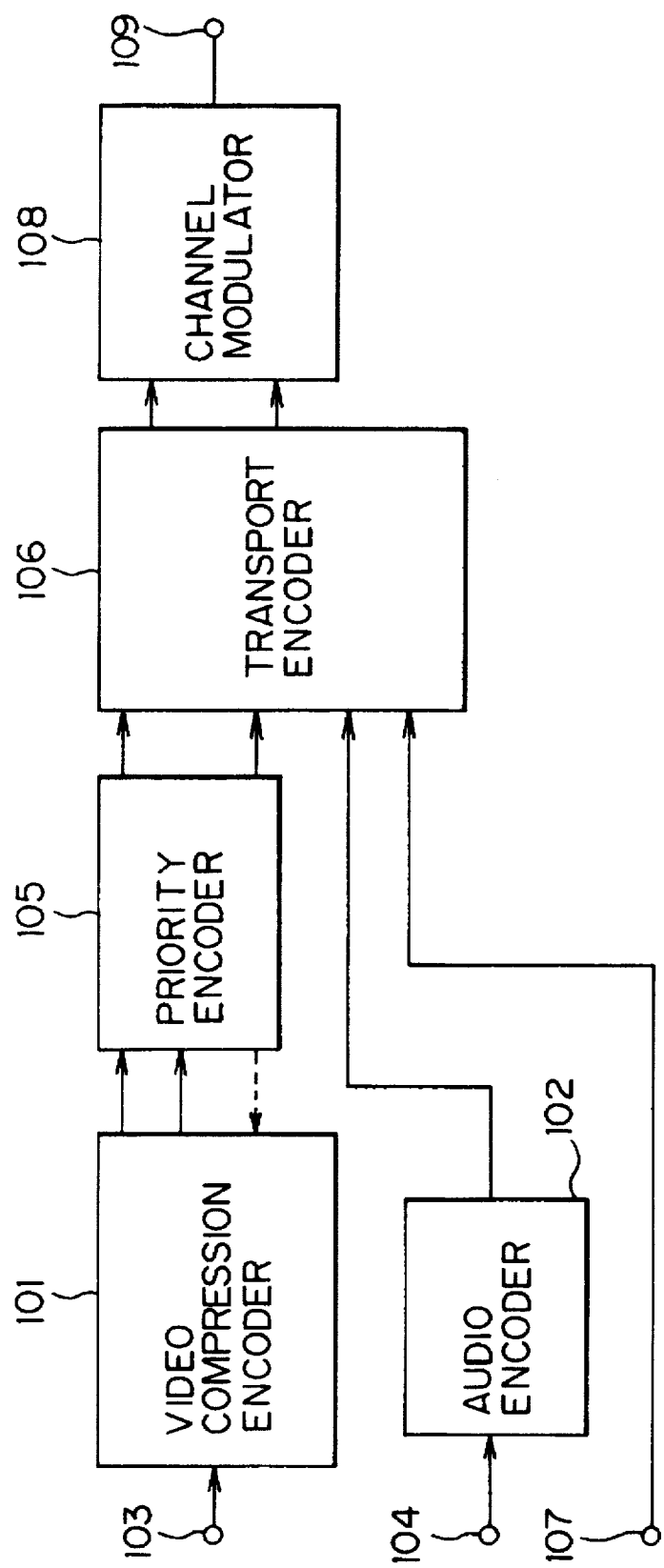
FIG. 1 is a block diagram of an advanced television (ATV) transmission system.

Referring now to the drawings, FIG. 1 is a block diagram of an advanced television (ATV) transmission system which is comprised of a video compression encoder 101, an audio encoder 102, a priority encoder 105, a transport encoder 106 and a channel modulator 108. An HDTV signal is supplied at a terminal 103 and is received by video compression encoder 101 which performs highly efficient compression of the HDTV signal by a method consistent with MPEG. Video compression encoder 101 utilizes DCT and motion compensation compression on the HDTV signal and produces a compressed HDTV signal which includes intra-coded frames of data (I-frames), predictive coded frames of data (P-frames), and bidirectionally predictive coded frames of data (B-frames) in a predetermined order.

FIG. 2 is a schematic diagram of one example of the format of the compressed data produced by video compression encoder 101. As shown, an I-frame is supplied first, followed by two B-frames, a P-frame, another two B-frames, a second P-frame, and then a third pair of B-frames. This pattern then repeats, starting with another I-frame. In DCT and motion compensation compression, each I-frame is produced by discrete cosine transforming a frame of video data without utilizing data from any other frame. Each P-frame is produced by motion compensating (i.e., differentiating) a current frame from the previous I-frame or P-frame, and the resulting differential signal is discrete cosine transformed (also called interframe coded data). Each B-frame is produced by motion compensating a current frame from the preceding and subsequent I-frames or P-frames, and the resulting differential signal is discrete cosine transformed. In the illustrated format shown in FIG. 2., the period of appearance of I-frames, or GOP (group of picture), is (M=3, N=9).

Video compression encoder 101 supplies the compressed HDTV signal to priority encoder 105 (FIG. 1) which prioritizes the different types of data in the compressed HDTV signal. An example of the types of data prioritized in I-frames include (from highest to lowest priority):

1. frame header
2. slice header
3. macroblock address, type and quantizing step
4. DC value
5. low frequency coefficient
6. high frequency coefficient An example of the types of data prioritized in P-frames and B-frames include (from highest to lowest priority):

1. frame header
2. slice header
3. macroblock address, type and quantizing step
4. motion vector
5. DC value
6. low frequency coefficient
7. high frequency coefficient As indicated, each I-frame includes a frame header followed by a slice header, a macroblock address, a type and quantizing step, a DC value, a low frequency coefficient and a high frequency coefficient. Similarly, each P-frame and B-frame includes a frame header, a slice header, a macroblock address, a type and quantizing step, a motion vector, a DC value, a low frequency coefficient, and a high frequency coefficient. Priority encoder 105 supplies the "prioritized" video data in the above-stated order to transport encoder 106 which creates "packets" of data from the supplied video data in the manner described below.

In addition to receiving prioritized video data, transport encoder 106 further receives encoded audio data from audio encoder 102 which encodes an audio signal supplied to a terminal 104. Transport encoder 106 may also receive other additional information which is supplied to a terminal 107. From the data supplied to transport encoder 106, packets having different priorities are created where packets having relatively high priority are classified as HP (high priority) packets and packets having relatively low priority are classified as SP (standard priority) packets. HP packets of each I-frame include data pertaining to the frame header (1) to the low frequency coefficient (6), and SP packets of each I-frame include only the high frequency coefficient data (7). HP packets of each P-frame and B-frame include data pertaining to the frame header (1) to the motion vector (4), and SP packets of each P-frame and B-frame include data pertaining to the DC value (5) to the high frequency coefficient (7). For typical video images, the ratio of HP packets to SP packets is 1:4. Transport encoder 106 supplies each HP packet in a carrier of high output power and each SP packet in a carrier of low output power to channel modulator 108 which modulates each type of packet using their respective carriers. The modulated signal is transmitted at terminal 109.

FIGS. 3A and 3B are schematic representations of the data structure of HP and SP packets. As shown in FIG. 3A, a packet includes SYNC data, followed by transmission data and 20 bytes of error correction code (ECC) for a total of 148 bytes per packet. The data structure of the transmission data is shown in FIG. 3B, and includes a service type (ST) byte of data, four bytes of after-header (AH) data, 120 bytes of transport data and FCS data. FIG. 4 illustrates the data structure of the service type byte which identifies the packet as an HP or an SP packet (bit P at position b7), and identifies the packet as a video packet, audio packet or other type of packet (ID at positions b4 to b6). In addition, counter data CC in the service type byte provides a count number of 0 to 15 (at positions b0 to b3) which identifies the packet within the series of packets provided.

FIG. 5A illustrates the data structure of the AH header in a HP packet and FIG. 5B illustrates the data structure of the AH header in a SP packet. As shown in FIG. 5A, the AH header of each HP packet includes a 10 bit slice starting point which indicates the starting point of the transfer data, the frame type (e.g., I-frame, P-frame, or B-frame), the frame number, the slice number in the frame, and the quantizing (Q) factor of the data. As shown in FIG. 5B, the AH header of each SP packet includes a 10 bit macro block start point, the frame type, the frame number, the macro block number in the frame, and the RSD.

The above-described ATV system compresses HDTV signals to a data width of approximately 17 to 19 Mbps which is less than the typical bit rate of recording NTSC signals by a digital VTR in the SD mode, which records NTSC signal at approximately 25 Mbps. Therefore, and as previously mentioned, ATV transmitted digital video signals may be recorded directly onto a magnetic tape medium by a digital VTR operating in SD mode without further compression or other form of decoding of the signals. However, high-speed reproduction of recorded ATV transmitted signals may not be easily accomplished for reasons similar to those described above with respect to the high-speed reproduction of NTSC and HDTV signals by a digital VTR. Specifically, since only portions of each track are reproduced in high-speed reproducing modes, partially reproduced P-frames and B-frames cannot be decoded by utilizing only partially reproduced I-frames, and further, positions of discrete cosine transformed data do not coincide with positions in a video image, and thus, scanning different portions of each track will not produce enough data to consistently renew each portion of the reproduced image. Therefore, it is necessary to further encode the transmitted ATV signal in order to reproduce relatively high-quality stable video images in high-speed reproducing modes.

Figure 6:
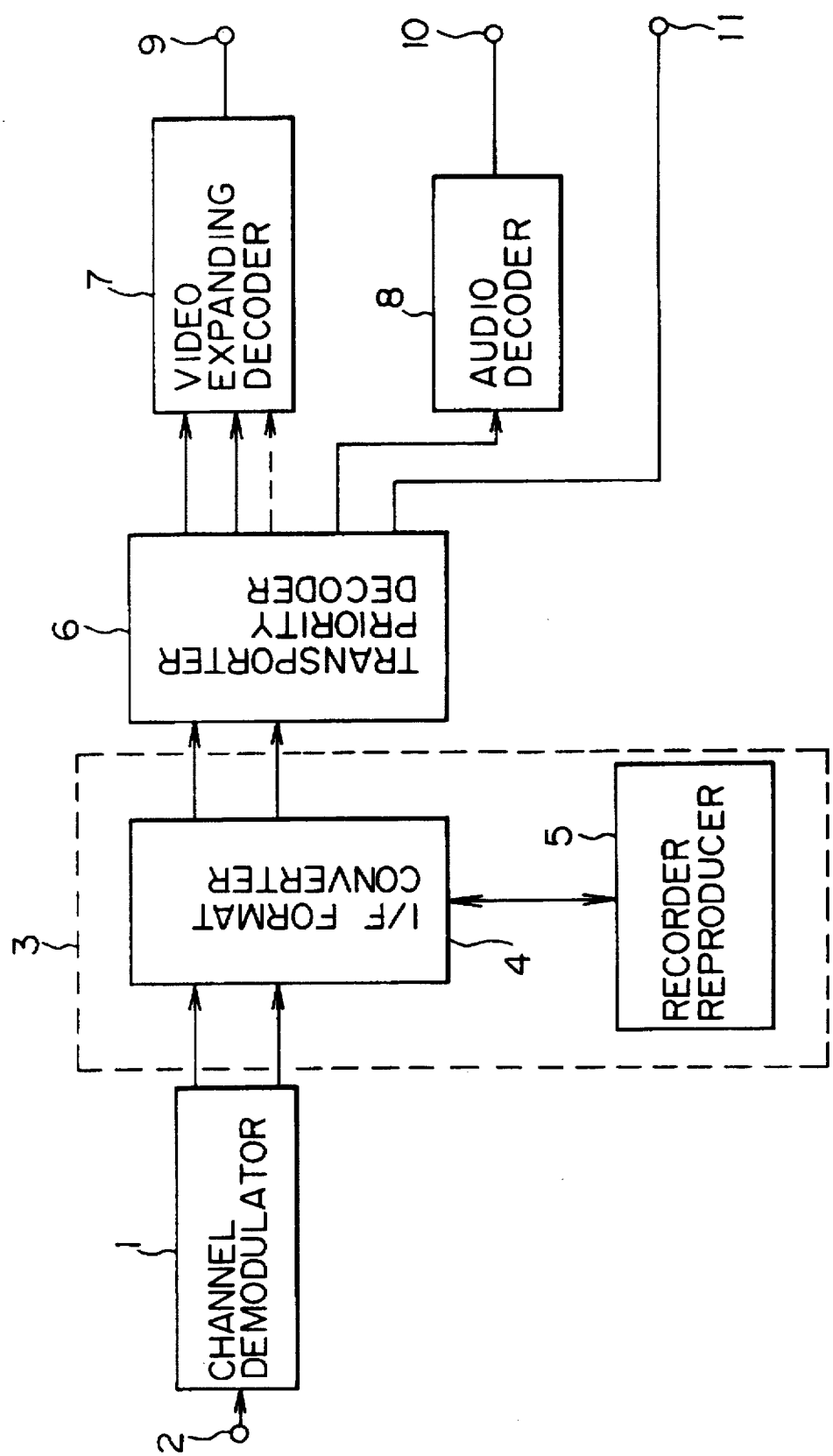
FIG. 6 is a block diagram of a recording/reproducing system in which the present invention finds ready application.

FIG. 6 is a block diagram of a recording/reproducing system in which the present invention finds ready application. As illustrated, the system is comprised of a channel demodulator 1, a digital VTR 3, a transporter priority decoder 6, a video expanding decoder 7 and an audio decoder 8. The above-described transmitted ATV signal is supplied to a terminal 2 and received by channel demodulator 1 which demodulates the packets of data in the ATV signal. The demodulated signal is supplied to digital VTR 3 which records the ATV signal onto a magnetic tape (further described below), and is also supplied to transporter priority decoder 6 which corrects errors and decodes the prioritized data in the packets to reproduce the compressed HDTV signal. Transporter priority decoder 6 supplies the compressed HDTV signal to video expanding decoder 7 which expands the data by decoding the coded signal in an inverse fashion (e.g., inverse DCT) as that performed by video compression encoder 101. The original HDTV signal produced by video expanding decoder 7 is supplied at a video output terminal 9. Transporter priority decoder 6 also supplies an encoded audio signal to audio decoder 8 which decodes the signal in an inverse fashion as that performed by audio encoder 102. The decoded audio signal is supplied at an audio output terminal 10. Other additional information provided in the demodulated signal is supplied by transporter priority decoder 6 at a terminal 11.

Digital VTR 3, in accordance with the present invention, includes an interface/format (I/F) converter 4 and a recorder/reproducer 5. The demodulated signal supplied by channel demodulator 1 is received by I/F converter 4 which formats the signal consistent with the present invention and supplies the formatted signal to recorder/reproducer 5 which records the formatted signal on a magnetic tape so that relatively high-quality images may be produced when the magnetic tape is reproduced in high-speed (also called variable-speed) reproducing modes. In addition, recorder/reproducer 5 is operable to record standard NTSC video signals in SD mode and standard HDTV signals in HD mode. When recording the formatted signal (i.e., the ATV signal) supplied by I/F converter 4, recorder/reproducer 5 is in SD mode.

Figure 7:
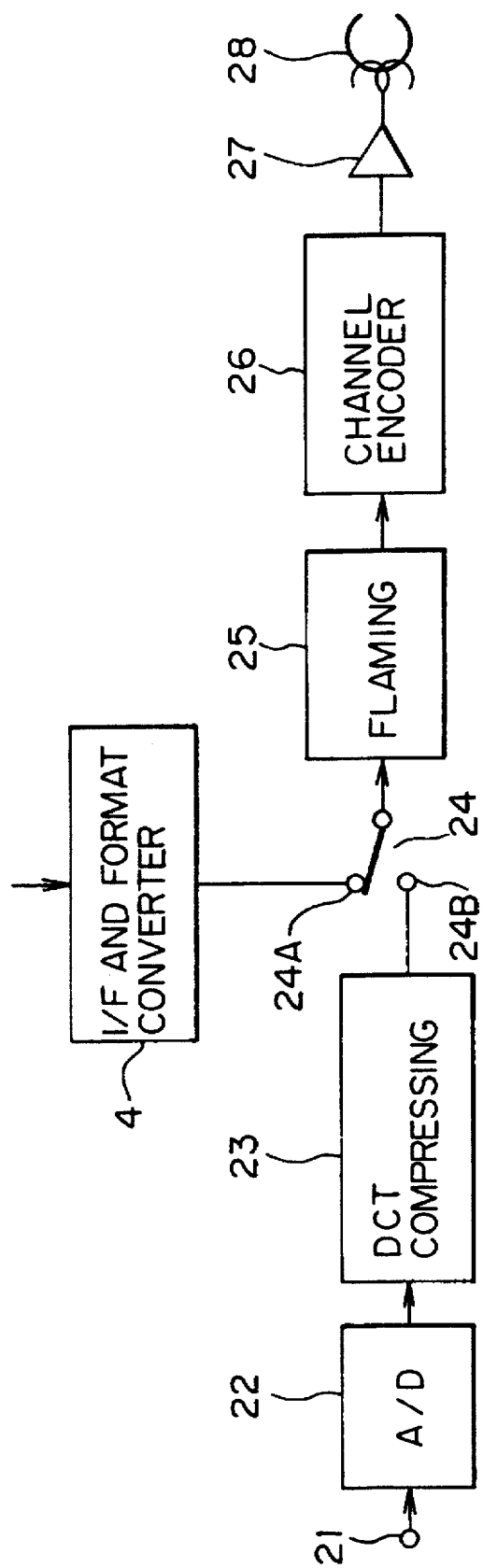
FIG. 7 is a block diagram of the recording portion of the digital video tape recorder illustrated in FIG. 6.

The process of recording an NTSC signal, an HDTV signal, and an ATV signal in digital VTR 3 is described with reference to FIG. 7. The recording circuit portion of digital VTR 3 includes an analog to digital (A/D) converter 22, a DCT compressing circuit 23, a switching circuit 24, a framing circuit 25, a channel encoder 26, a recording amplifier 27, and a rotating head 28. When an NTSC or HDTV signal is to be recorded on a magnetic tape (not shown), the NTSC or HDTV signal is supplied via an input terminal 21 to A/D converter 22 which converts the television signal to digital form. A/D converter 22 supplies the digital signal to DCT compressing circuit 23 which blocks, shuffles and discrete cosine transforms the digital signal into predetermined buffering units. The buffering units are then quantized, variable length encoded and framed before being supplied out as a digital video signal to switching circuit 24. Discrete cosine transforming, quantizing and variable length encoding of digital data are well known in the art and do not form any part of the present invention per se.

Switching circuit 24 switches between its inputs 24A and 24B, and supplies signals supplied to input 24A to framing circuit 25 when ATV signals are to be recorded on the magnetic tape, and supplies signals supplied to input 24B to framing circuit 25 when signals supplied to input terminal 21 are to be recorded on the magnetic tape. Switching circuit 24 supplies the digital signal received from DCT compressing circuit 23 to framing circuit 25 which generates (frames) sync blocks of recordable video data having error correction data and supplies the recordable video data to channel encoder 26 which modulates the video data before being amplified by recording amplifier 27 and recorded on the magnetic tape by head 28.

When an ATV signal is to be recorded on the magnetic tape, an ATV signal is supplied from channel demodulator 1 (FIG. 6) to I/F converter 4 which rearranges the ATV signal in a format which places the above-described HP packets of I-frames in the ATV signal at locations which are to be recorded on each track which are reproduced when the recorded data is reproduced in a digital VTR operating in a high-speed reproducing mode. Specifically, "trick-play" areas are identified as those areas on each track which may be reproduced at predetermined tape moving speeds in high-speed search modes and the I-frame HP packets are recorded in those identified "trick-play" areas of each track. Formatting the ATV signal by I/F converter 4 is further described below.

I/F converter supplies the formatted ATV signal to terminal 24A of switching circuit 24 which supplies the signal to framing circuit 25. The formatted ATV signal is framed by framing circuit 25, modulated by channel encoder 26, amplified by recording amplifier 27, and recorded on a magnetic tape by head 28.

Figure 8:
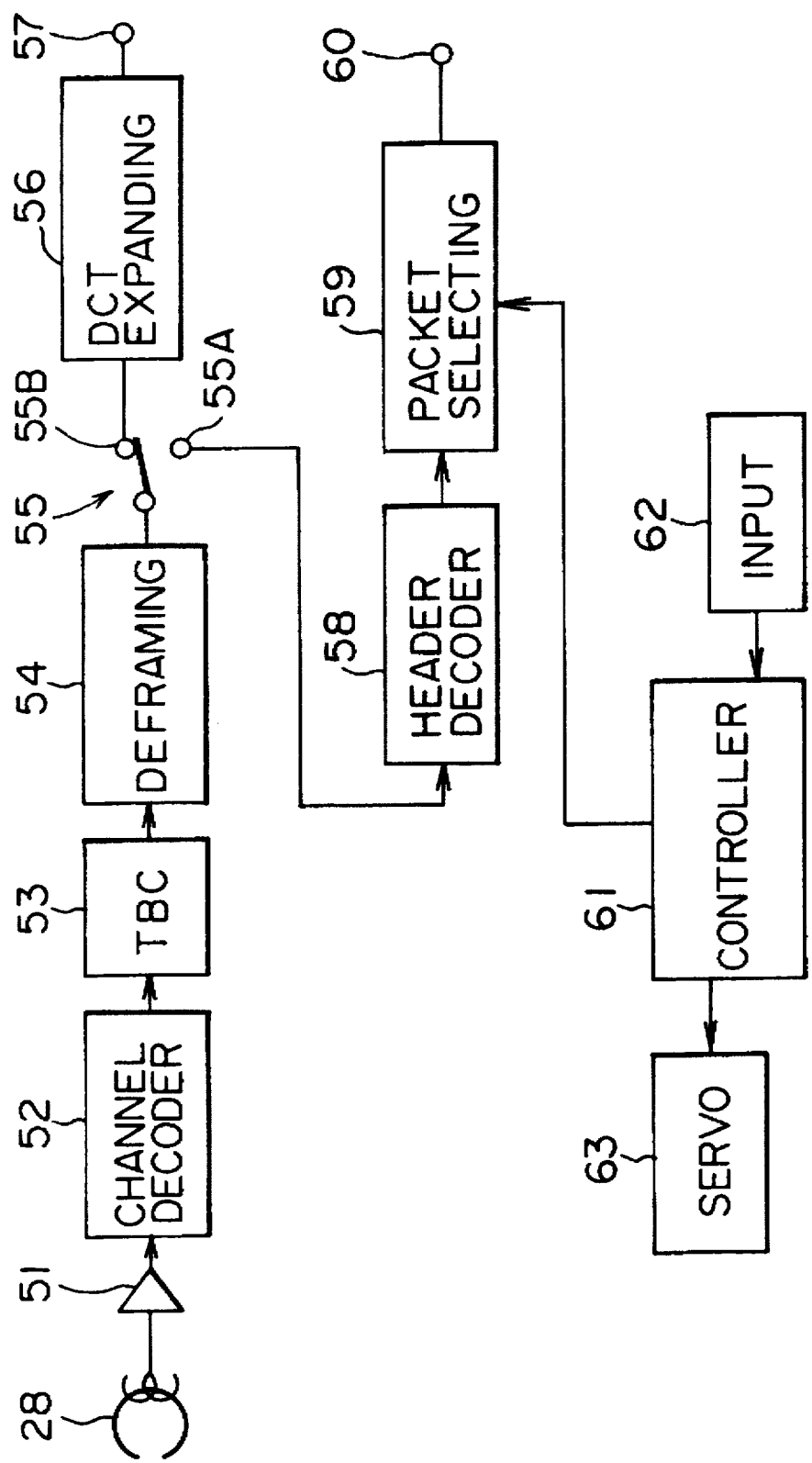
FIG. 8 is a block diagram of the reproducing portion of the digital video tape recorder illustrated in FIG. 6.

The process of reproducing an NTSC signal, an HDTV signal, and an ATV signal from a magnetic tape by digital VTR 3 is described with reference to FIG. 8. The reproducing circuit portion of digital VTR 3 includes rotating head 28, a reproducer amplifier 51, a channel decoder 52, a time base corrector (TBC) 53, a deframing circuit 54, a switching circuit 55, and a DCT expanding circuit 56. Head 28 reproduces a video signal from the magnetic tape and supplies the reproduced signal to channel decoder 52 through reproducer amplifier 51. Channel decoder 52 demodulates the reproduced signal in an inverse fashion as that performed by channel encoder 26 and supplies the demodulated signal to time base corrector 53 which removes time base fluctuation components from the reproduced signal. Time base corrector 53 supplies the time base corrected signal to deframing circuit 54 which deframes the signal in an inverse manner as that performed by framing circuit 25.

Deframing circuit 54 supplies the reproduced signal to switching circuit 55. Switching circuit 55 supplies the reproduced signal to a terminal 55A when the signal is a component video signal (e.g., an NTSC television signal or an HDTV signal) and supplies the signal to a terminal 55B when the signal is an ATV signal. When the reproduced signal is a component video signal, switching circuit 55 supplies the signal to DCT expanding circuit 56 which expands the compressed reproduced video signal to its original band width by performing inverse variable length encoding and inverse discrete cosine transforming of the video signal. The expanded video signal is supplied out at output terminal 57.

When the reproduced signal is an ATV signal, switching circuit 55 supplies the ATV signal at terminal 55A to an ATV decoding circuit which decodes the signal in accordance with the present invention. The ATV decoding circuit includes a header decoder 58, a packet selecting circuit 59, a controller 61, an input circuit 62, and a servo circuit 63. Header decoder 58 decodes the header of the reproduced ATV signal to determine if the signal is an I-frame (see FIG.

5A), and supplies the decoded header with the ATV signal to packet selecting circuit 59 which selects in response to a control signal supplied from controller 61 only the I-frames for output at terminal 60 when the digital VTR 3 is reproducing the stored digital signal in a high-speed reproducing mode and which supplies the entire reproduced ATV signal for output at terminal 60 in a normal reproducing mode. In either mode, the signal supplied to terminal 60 is supplied to video expanding decoder 7 via transporter priority decoder 6 (FIG. 6) which decodes the video signal as previously described. In a high-speed reproducing mode, all of the data in the I-frames are reproduced and selected for output in packet selecting circuit 59, which results in relatively high-quality high-speed reproduced images.

Input circuit 62, which may be controlled by an operator or a system controller (not shown), supplies a mode select signal to controller 61 which identifies whether the stored video signal is being reproduced in a normal reproducing mode or a high-speed reproducing mode. In response to the mode select signal, controller 61 controls packet selecting circuit 59 by means of a control signal to either select only I-frames for output or the entire reproduced ATV signal for output. In addition, controller 61 controls servo circuit 63 in response to the mode select signal which controls the phase of travel of the magnetic tape utilizing an ATF signal or other type of tracking signal to maintain the proper positional relationship between the reproducing heads and the tracks.

Figure 9:
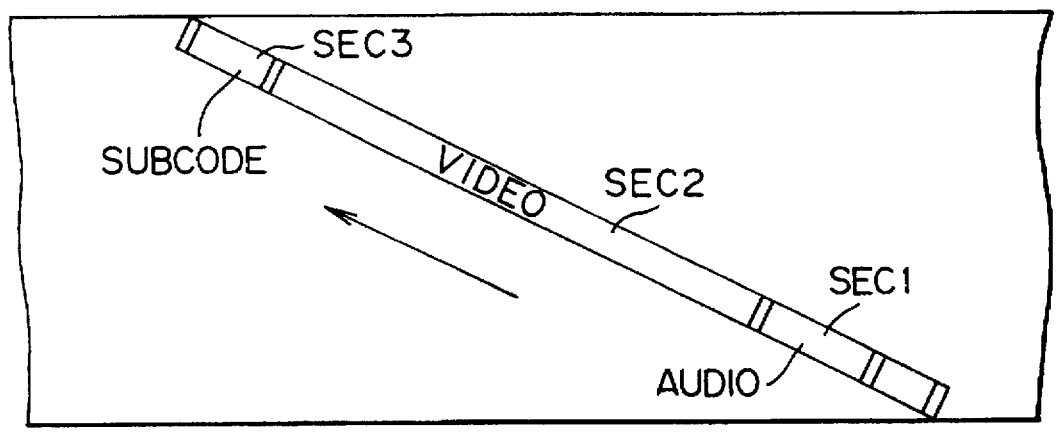
FIG. 9 is a schematic illustration of the data structure of a track on a magnetic tape medium.
Figure 10:
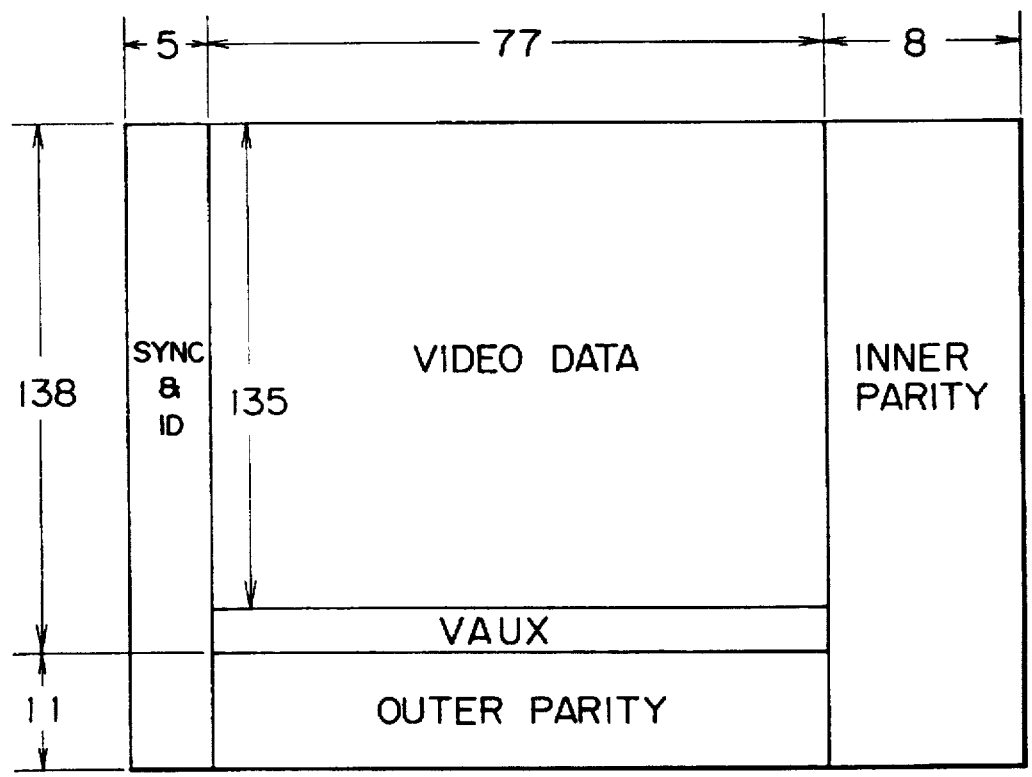
FIG. 10 is a schematic illustration of the data format of the video area of a track shown in FIG. 9.

FIG. 9 illustrates the data structure of a track recorded on a magnetic tape by a digital VTR of the present invention. As shown, a track is comprised of an audio area SEC1, a video area SEC2 and a subcode area SEC3. FIG. 10 illustrates the data structure of the video area SEC2 which includes 135 data sync blocks for storing video data therein, 3 video auxiliary (VAUX) sync blocks for storing other information and 11 outer parity sync blocks for storing parity data for a total of 149 sync blocks in each video area SEC2 of a track. Each data sync block includes a 5 byte sync and ID area, followed by a 77 byte video data area and an 8 byte inner parity area for storing error correction code.

Figure 11:
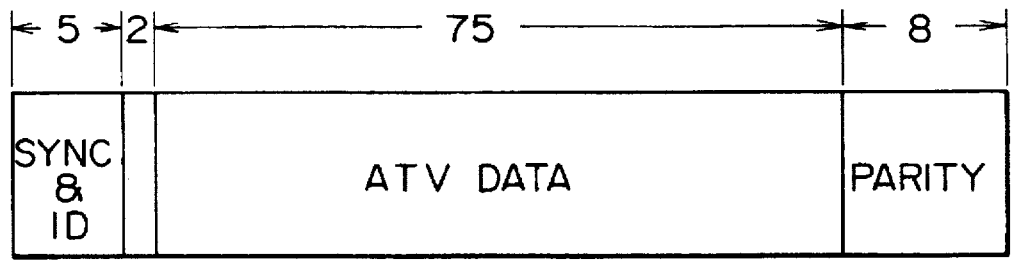
FIG. 11 is a schematic representation of a sync block of an advanced television signal.

The video area SEC2 of a track has the above described data structure when a track is recorded in the SD mode, wherein the drum rotation speed is approximately 150 Hz and one video frame is recorded on ten tracks by two heads which have different azimuths. FIG. 11 illustrates the data structure of a video sync block. As shown, ATV data is stored in 75 of the 77 byte video data area of each video sync block. Therefore, the rate of recording ATV data on a track by a digital VTR is:

$$\frac{75 \text{ bytes}}{sb} \times \frac{135 \, sb}{\text{track}} \times \frac{10 \text{ tracks}}{\text{frame}} \times \frac{30 \text{ frames}}{\text{second}} \times \frac{8 \text{ bits}}{\text{byte}} = 24 \text{ Mbps}$$

sb = sync block.

However, since the data rate of an ATV signal is approximately 17 to 19 Mbps and the rate of recording a video signal is approximately 24 Mbps, unused space identified as "marginal areas" are produced on each track when an ATV signal is recorded in the SD mode. Therefore, and in accordance with the present invention, data from I-frames of the ATV signal are recorded again in the marginal areas of each track where the marginal areas are located at those positions of each track which are reproduced in high-speed reproducing modes resulting in the reproduction of relatively high-quality images. In one embodiment of the present invention, the low-band coefficient data of each I-frame is stored in the marginal areas since most of the important data pertaining to a frame is contained in the low-band coefficient data.

Figure 12:
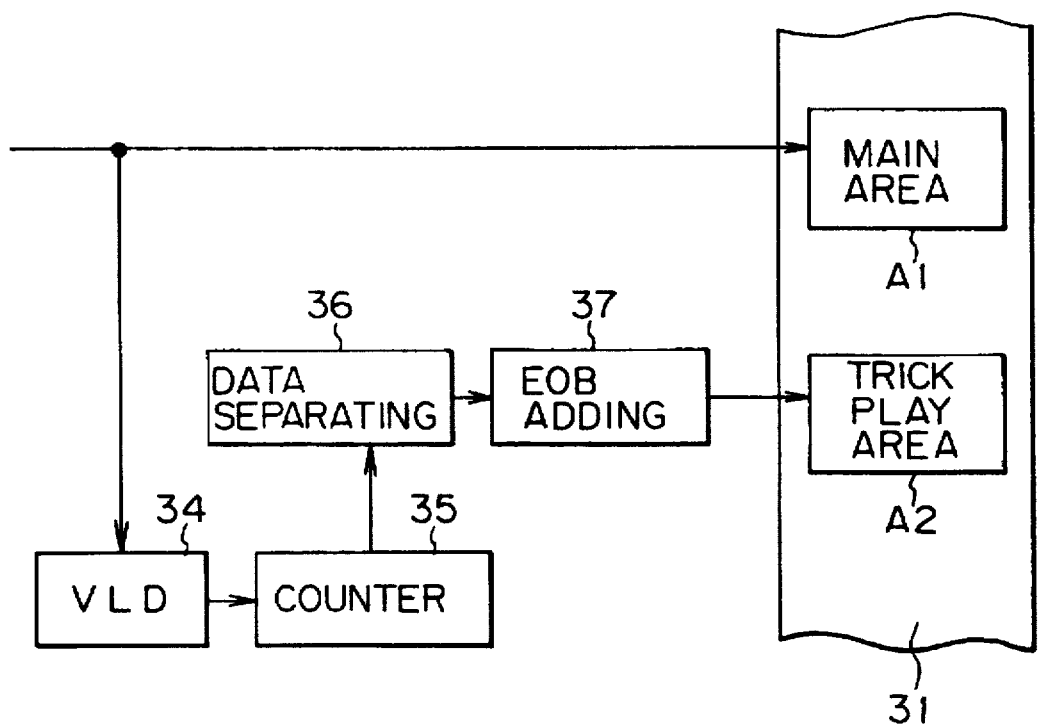
FIG. 12 is a block diagram illustrating the recording of an advanced television signal in the main area and the trick-play area of a track.

FIG. 12 is a block diagram illustrating the process of recording an ATV signal on a track in accordance with the present invention. As shown, each video area of a track on a magnetic tape 31 is divided into a main area A1 and a "trick-play" area A2 in which the trick-play area A2 corresponds to the marginal area referred to above and is located in areas of a track which are reproduced when the digital VTR is operating in a high-speed reproducing mode. When recording an ATV signal, the ATV signal is entirely stored in the main area A1 of each track, and the ATV signal is also supplied to a VLD decoding circuit 34 which decodes the ATV signal in order to determine if an I-frame of data is being supplied. VLD decoding circuit 34 supplies the ATV signal to a counter 35 which maintains a count of that data received from VLD decoding circuit 34 which is to be recorded in the trick-play area of the track. Counter 35 supplies the ATV signal and the maintained count to a data separating circuit 36 which extracts the low-band coefficient data of each I-frame block of data (the HP packet data) to be stored in the trick-play areas in response to the determination of whether the data pertains to an I-frame as determined by VLD decoding circuit 34. Since only the low-band coefficient of each I-frame is recorded, "End of Block" data is added to the extracted data by EOB adding circuit 37 before the data is stored in the trick-play areas of each track. In this instance, when the trick-play areas A2 of each track are reproduced in a high-speed reproducing mode, signals recorded in the trick-play areas may be easily decoded by video expanding decoder 7. Thus, adding EOB data to the extracted data (i.e., the low-band component of each I-frame) prior to recording in the trick-play areas ensures that data reproduced in high-speed reproducing modes has the same format as data reproduced in normal or standard-speed reproducing modes.

Figure 13:
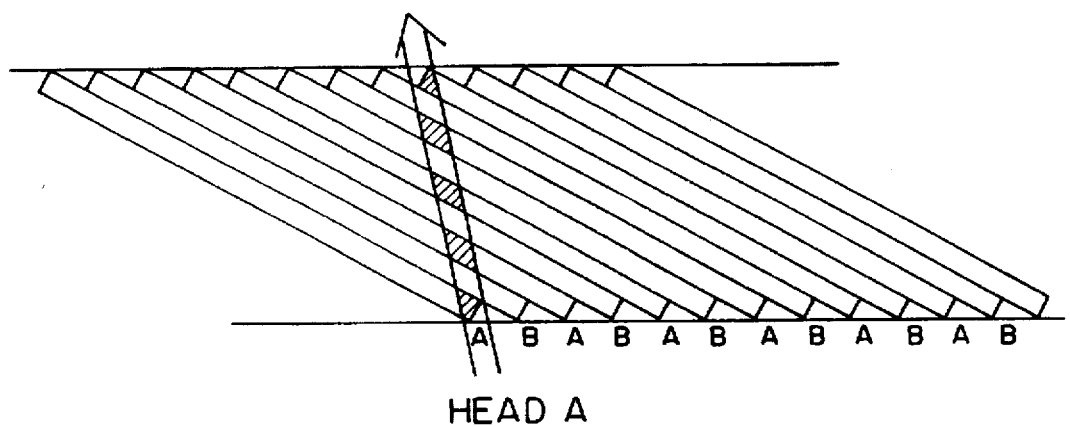
FIG. 13 is a schematic representation of the path of a head during a high-speed reproducing operation in accordance with the present invention.
Figure 14A:
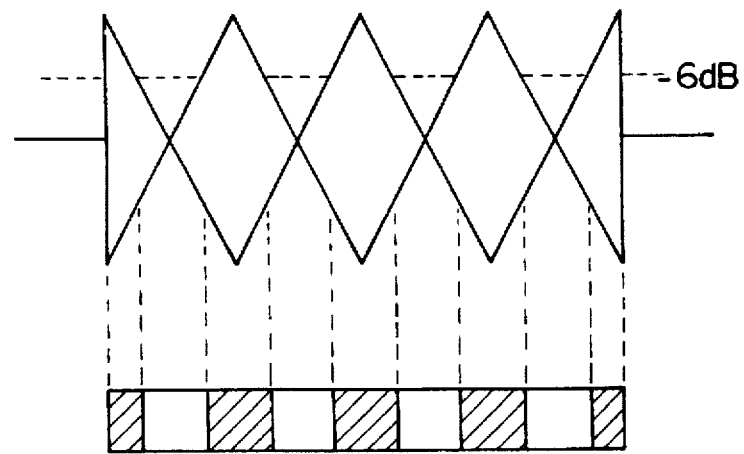
FIGS. 14A and 14B are schematic illustrations of the reproduced signal in a high-speed reproducing mode.
Figure 14B:

The process of determining the locations of the trick-play areas in each track is now described with reference to FIGS. 13–17. FIG. 13 is a schematic representation of the path of a reproducing head during a high-speed reproducing operation in accordance with the present invention. As shown, head A scans the tracks while the magnetic tape is transported at a substantially faster than normal speed. Since tracks are generally helically recorded by two heads which have different azimuths, head A reproduces scanned portions of alternating tracks. That is, head A reproduces those areas shown in FIG. 13 which are partially shaded, and as shown, the reproduced areas are located only on "A" tracks. FIG. 14A illustrates that the signal reproduced from each A track is in the form of a burst, where the greatest part of the signal occurs when the head is at the center of each track as shown in FIG. 14B. Then, ATF tracking to control the tape moving speed in a high-speed reproducing mode may easily be accomplished by locking the phase of the reproduced signal with the movement of the tape.

Figure 15A:
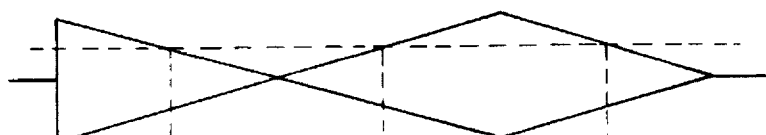
Figure 15B:
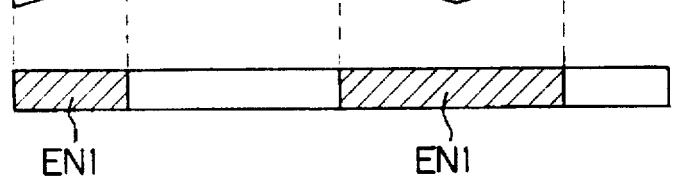
Figure 15D:
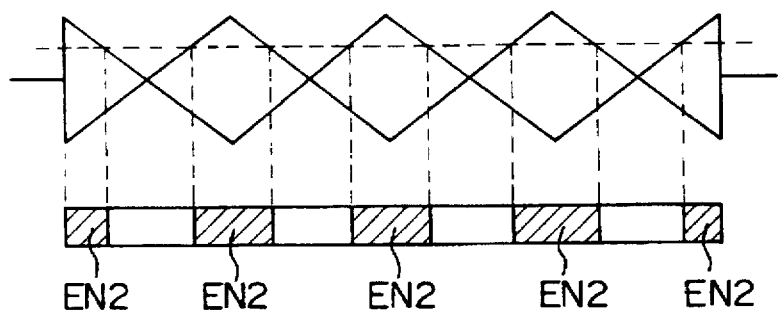
Figure 15F:
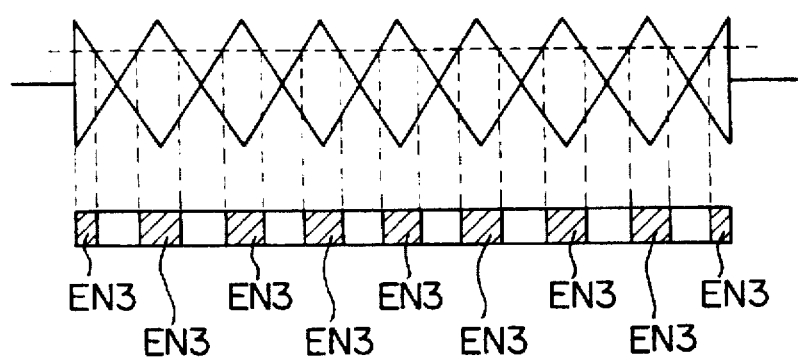

FIGS. 15A, 15C and 15E illustrate waveforms of signals reproduced at 4 times normal speed, 9 times normal speed and 17 times normal speed, respectively, and FIGS. 15B, 15D and 15F illustrate those areas of each track which are reproduced at 4 times normal speed, 9 times normal speed and 17 times normal speed, respectively. As shown in FIGS. 15A an 15B, a head reproduces a first (i.e., beginning) portion of a first track which corresponds to the left most area EN1 (first EN1 area), and does not reproduce a second portion of a second track which corresponds to the area of a track which is located to the right of the first EN1 area (i.e., the area between the two EN1 areas). Then, the head reproduces a third portion of a third track which corresponds to the other EN1 area (second EN1 area), and does not reproduce a fourth portion (i.e., a final portion) of a fourth track which corresponds to the area of a track which is located to the right of the second EN1 area. It is to be noted that the horizontal location in FIG. 15B represents the length-wise location of each track.

FIGS. 15C and 15D illustrate the track areas EN2 which are reproduced when the digital VTR is operating in a 9 times high-speed reproducing mode. As shown, nine tracks are scanned by a reproducing head, but only tracks 1, 3, 5, 7 and 9 are reproduced whose reproduced areas EN2 are shown in FIG. 15D.

FIGS. 15E and 15F illustrate the track areas EN3 which are reproduced when the digital VTR is operating in a 17 times high-speed reproducing mode. As shown, 17 tracks are scanned by the reproducing head, but only every other track (i.e., tracks 1, 3, 5 . . . 15, and 17) are reproduced whose reproduced areas EN3 are shown in FIG. 15F.

In accordance with the present invention, when the above-described trick-play areas are situated in the areas EN1, EN2 and EN3 of each track, reproduction at 4 times normal speed, 9 times normal speed and 17 times normal speed is possible. In addition, since reproduction in high-speed mode may begin at any tape position, any one of the reproducible areas (e.g., any EN3 area) of a track may be reproduced, and therefore, to ensure reproduction in high-speed mode, trick-play areas are situated in every area EN3 of each track when reproduction is desired in a 17 times high-speed reproducing mode.

When the trick-play areas are located at areas of a track which are reproduced at, for example, 4 times, 9 times, and 17 times normal speed, successful reproduction of the trick-play areas may also be accomplished at reverse speeds of 2 times, 7 times, and 15 times normal reverse speed. Reverse reproduction is possible at (M−2) times reverse speed reverse when high-speed reproduction is possible at M times normal speed because the path of the head over the tape during reverse tape movement is symmetrical to the path of the head during forward tape movement. However, because each track is obliquely formed on the tape, two less tracks are scanned during reverse reproduction than are scanned during forward reproduction at the same, but reverse, tape speed.

Each reproduced area during high-speed reproduction corresponds to 32 sync blocks, however, 38 sync blocks may be allocated as trick-play areas. Therefore, the low-band component of each I-frame may easily be recorded in the trick-play areas of each track. When the rate of recording by a digital VTR is 24.948 Mbps, and the rate of data of an ATV signal is 19.2 Mbps, then 104 sync blocks of each track are utilized as the main data area for recording the ATV signal as shown by the equation: 135 sync blocks/track×19.2 Mbps/24.948 Mbps=104 sync blocks, and therefore, 31 sync blocks (135−104=31) are available to be used as the trick-play areas.

Figure 16:
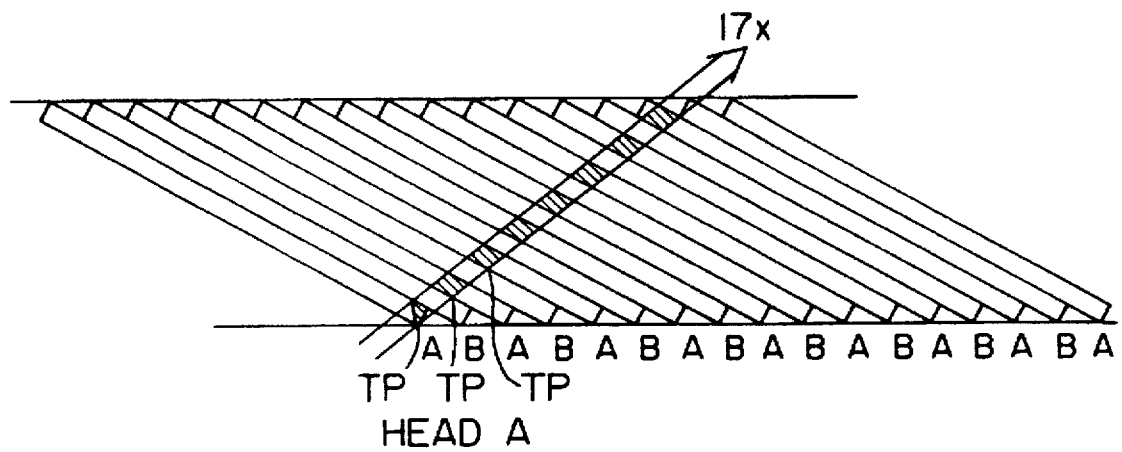
FIG. 16 is a schematic representation of the path of a head during a 17 times high-speed reproducing operation in accordance with the present invention.
Figure 17:
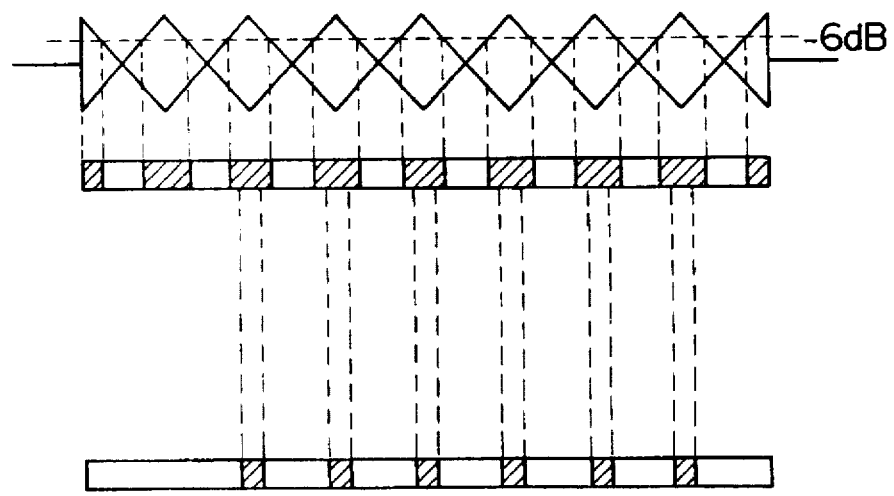
FIG. 17 is a schematic illustration of the signal reproduced by the head whose path is illustrated in FIG. 16.

FIG. 16 illustrates the path of a head A during a 17 times high-speed reproducing operation in accordance with another embodiment of the present invention. As shown, head A scans a different portion of 17 tracks in one scan pass and reproduces data stored in the trick-play areas TP of the A tracks. FIG. 17 shows the waveform of the signal reproduced by head A. As previously described, high priority data (e.g., low-band coefficient data of each I-frame), also called trick-play data, is stored in the trick-play areas TP where the maximum speed of reproduction M is an odd integer multiple of a standard speed of reproduction such that, M=2N+1. For example, when the maximum speed of reproduction is 17 times the normal reproducing speed, M=17 and N=8. Areas which are reproduced at the maximum speed of reproduction are designated as the trick-play areas.

Figure 18A:
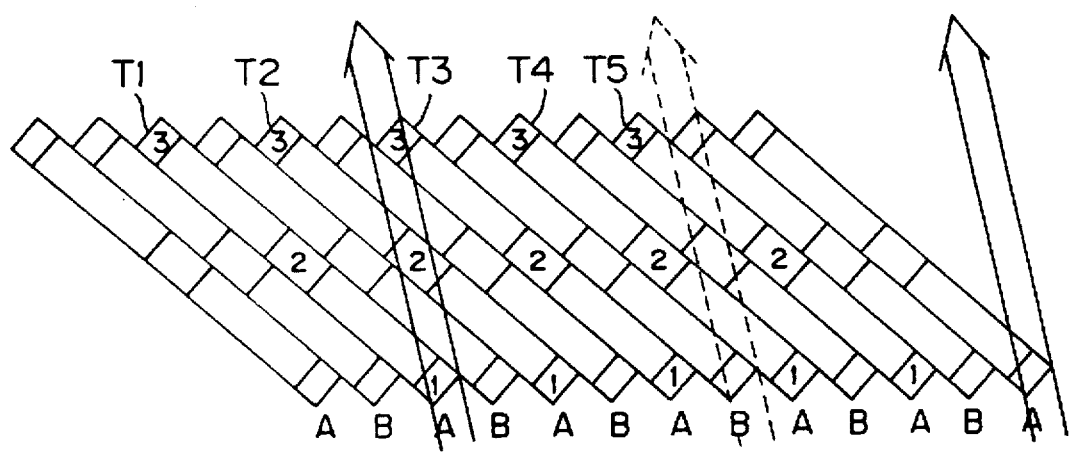
FIGS. 18A and 18B are schematic diagrams of the path of reproducing heads over recorded tracks having trick-play areas in accordance with the present invention.
Figure 18B:
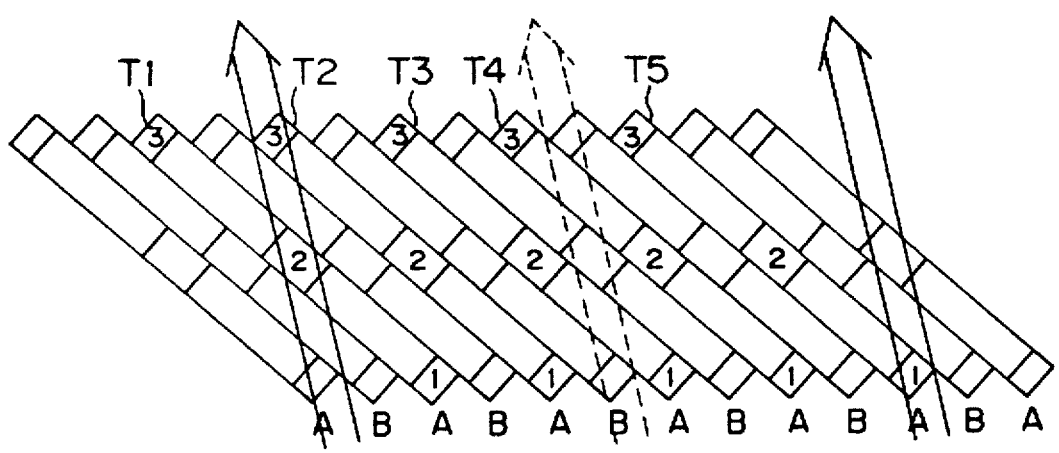

In accordance with this embodiment, the same high priority data is stored in the trick-play areas of each of M successive tracks having the same azimuth where each trick-play area on a track contains a different portion of the trick-play data. For example, when the maximum speed of reproduction is 5 times the normal reproducing speed (M=5), the same trick-play data is recorded of the five tracks T1 to T5 shown in FIGS. 18A and 18B. In addition, the same data is stored in each of the beginning trick-play areas (1) of tracks T1 to T5, the same data is stored in each of the middle trick-play areas (2) of tracks T1 to T5, and the same data is stored in each of the end trick-play areas (3) of tracks T1 to T5. Then, when the same trick-play data is recorded in M (e.g., 5) successive tracks having the same azimuth, trick-play data is fully reproduced at reproducing speeds of 1.5 times, 2.5 times, 3.5 times to N+0.5 times the normal reproducing speed, in addition to the maximum reproducing speed M. Therefore, a digital VTR operating in the variable-speed reproducing mode is operable to reproduce the trick-play data at speeds of 1.5 times, 2.5 times, 3.5 times . . . up to N+0.5 times the normal reproducing speed, as well as the maximum reproducing speed.

Figure 19:
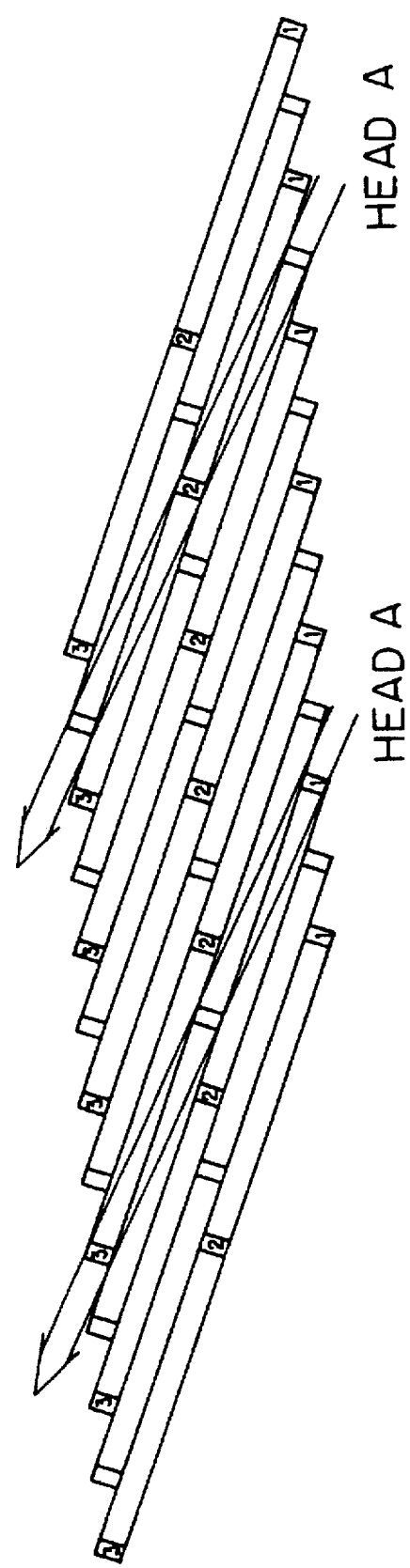
FIG. 19 is a schematic diagram of the path of a head A scanning tracks with an azimuth A in accordance with the present invention.
Figure 20A:
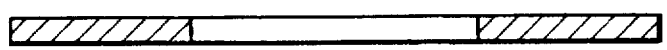
FIGS. 20A and 20B are helpful in understanding how a head A reproduces the outer and middle trick-play areas in two scans in accordance with the present invention.
Figure 20B:

When the digital VTR of the present invention is in the variable-speed reproducing mode operating at one of the speeds 1.5 times, 2.5 times . . . N+0.5 times the normal reproducing speed, all of the trick-play data stored on a track is reproduced in two scans by the same reproducing head A, as shown in FIG. 19. In FIG. 19, the maximum reproducing speed is set to 7 times normal speed but reproduction is performed at 3.5 times normal speed. In this case, the shaded trick-play areas located at the beginning and end of an A track are reproduced in one scan pass by head A and the shaded trick-play area located in the middle of an A track is reproduced in the second scan pass by head A. FIGS. 20A and 20B illustrate the portions of a track which are reproduced in the first and second scan passes, respectively.

Therefore, by recording the same trick-play data on M tracks having the same azimuth, where M is odd and N=(M−1)/2, the trick-play data stored on those tracks having the same azimuth is entirely reproduced in two scan passes by the same head when reproduction is performed at speeds of 1.5 times, 2.5 times, 3.5 times . . . up to N+0.5 times the normal reproducing speed, and the trick-play data is entirely reproduced in one scan pass by the same head at the maximum reproducing speed M.

Figure 21:
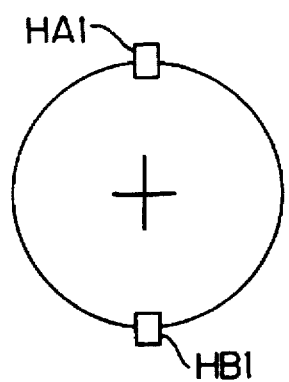
FIG. 21 is a schematic illustration of one type of drum arrangement.
Figure 22:
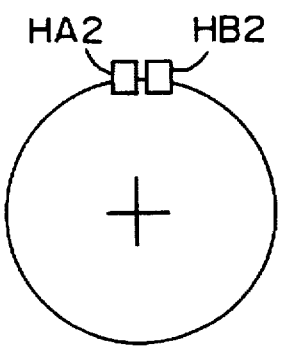
FIGS. 22 is a schematic illustration of a second type of drum arrangement.
Figure 23:
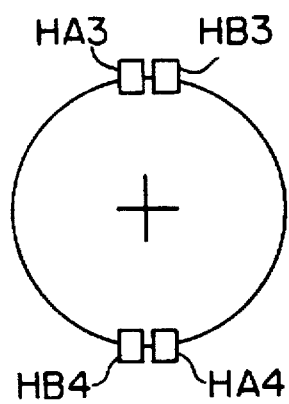
FIGS. 23 is a schematic illustration of a third type of drum arrangement.

Reproduction of trick-play areas by digital VTRs having different types of drum arrangements will now be described with reference to FIGS. 21 to 29. FIGS. 21, 22 and 23 are schematic illustrations of three types of drum arrangements in which FIG. 21 illustrates a pair of heads HA1 and HB1 having azimuths A and B, respectively, which are disposed 180° apart from one another, and which rotate at 9000 rpm (revolutions per minute). FIG. 22 illustrates a pair of adjacent heads HA2 and HB2 having azimuths A and B, respectively, (also known as double-azimuth arrangement) and which rotate at 9000 rpm. FIG. 23 illustrates a pair of adjacent heads HA3 and HB3 having azimuths A and B, respectively, and a second pair of adjacent heads HA4 and HB4 having azimuths A and B, respectively, disposed 180° apart and which rotate at 4500 rpm.

Figure 24:
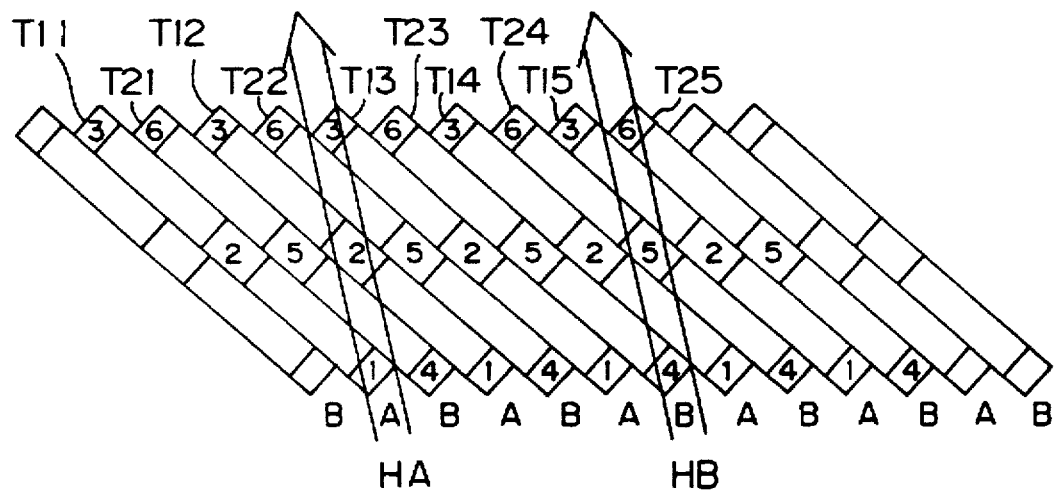
FIG. 24 is a schematic diagram of the path of one pair of heads scanning recorded tracks having trick-play areas in accordance with the present invention.
Figure 25:
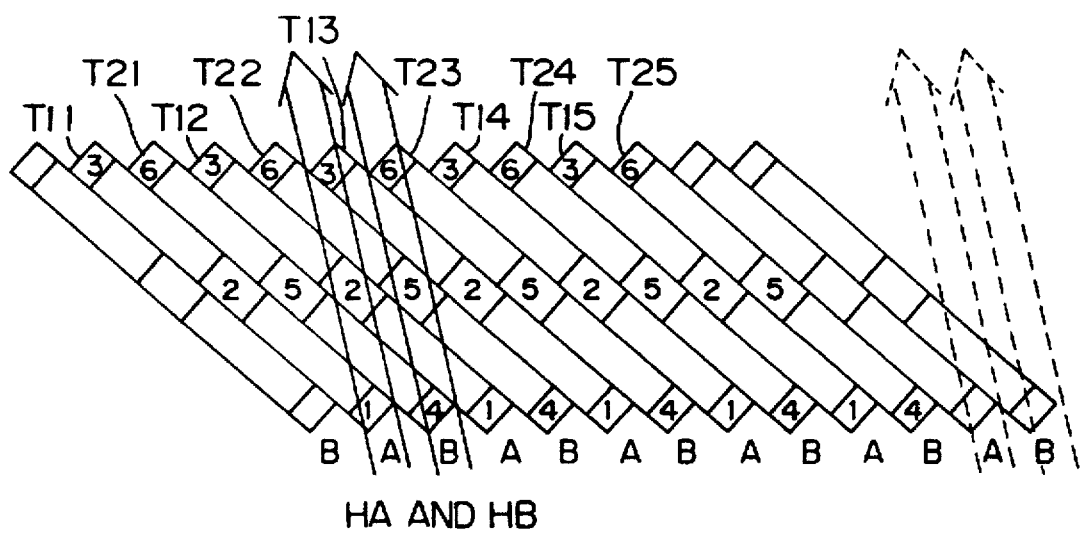
FIGS. 25 is a schematic diagram of the path of another pair of heads having a different construction when scanning recorded tracks having trick-play areas in accordance with the present invention.

FIGS. 24 and 25 illustrate an example of tracks recorded in accordance with the present invention in which the maximum reproducing speed is 5 times normal speed, 5 successive A tracks T11, T12, T13, T14 and T15 have identical trick-play data stored therein, and 5 successive B tracks T21, T22, T23, T24 and T25 have identical trick-play data stored therein. Reproduction by two heads HA and HB disposed 180° apart (see FIG. 21) reproduce trick-play areas 1–3 and trick-play areas 4–6, respectively, as shown in FIG. 24. On the other hand, reproduction by two adjacent heads HA and HB (see FIG. 22) reproduce trick-play areas 1–3 and trick-play areas 4–6, respectively, as shown in FIG. 25.

FIG. 26 provides a summary of the forward and reverse tape reproducing speeds by digital VTRs having the drum arrangements shown in FIGS. 21 to 23. As indicated, a digital VTR whose drum has two heads disposed 180° apart and which rotates at 9000 rpm (FIG. 21) or two adjacent heads and which rotates at 9000 rpm (FIG. 22) can reproduce at speeds of 1.5, 2.5 ... N+0.5 and 2N+1 (M) times the normal reproducing speed and reverse speeds of −1.5, −2.5, ... −(N+0.5) and −(2N−1) times the normal reproducing speed. A digital VTR which has a drum which has two pairs of adjacent heads and which rotates at 4500 rpm (FIG. 23) can reproduce at speeds of 1.5, 2.5 ... N+0.5 times the normal reproducing speed and reverse speeds of −1.5, −2.5, ... −(N+0.5) times the normal reproducing speed. Since the scanning angle of a head is doubled at the same speed in the head construction shown in FIG. 23, the maximum tape speed of this arrangement is one half of the maximum tape speed of the other head constructions.

Figure 27A:
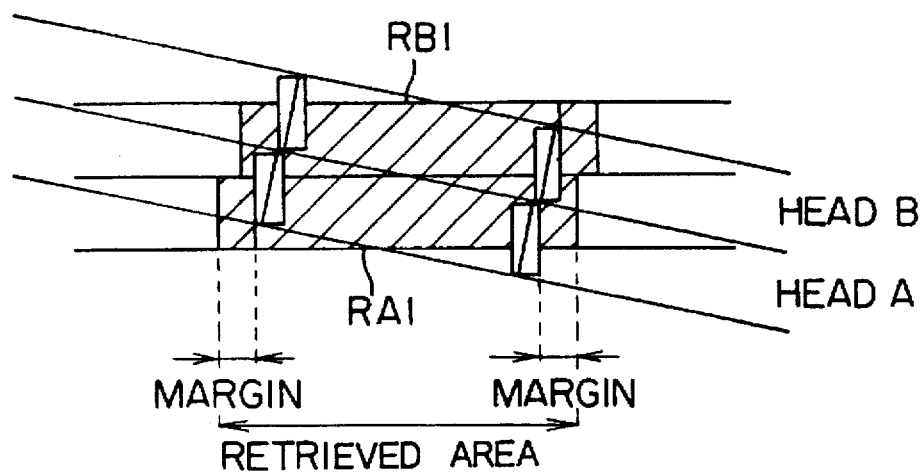
FIGS. 27A and 27B are schematic illustrations of the path of a pair of heads having different constructions over two tracks.
Figure 27B:
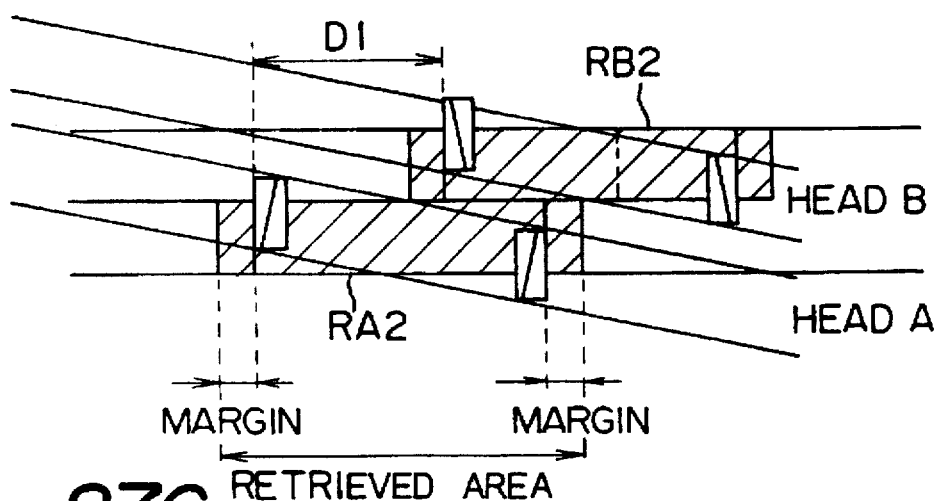

Consideration of the gap distance between heads will now be discussed with reference to FIGS. 27A to 27C and FIGS. 28A and 28B. FIGS. 27A and 27B illustrate the path of one of the two heads disposed 180° apart and the path of one of the two adjacent heads, respectively. As shown in FIG. 27A, head A reproduces track portion RA1, head B reproduces track portion RB1, and margin areas are located at both ends of the reproduced area of each track. However, when heads are adjacent to one another, the path of head B is different from the path of a head B in the first arrangement which results in the displacement of reproduced area RB2 and which corresponds to the inter-gap distance D1, as shown in FIG. 27B.

Figure 27C:
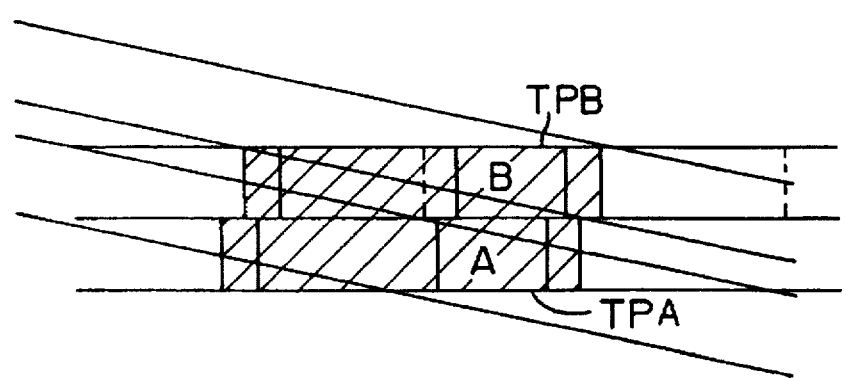
FIG. 27C is a schematic illustration of the location of a trick-play area in each track.

FIG. 27C illustrates the location of a trick-play area on a track which is reproduced by either of the above-described drum structures when reproducing in high or variable-speed reproducing modes. As shown, a trick-play area TPB is located at the portion of a track which is common to area RB1 (FIG. 27A) and area RB2 (FIG. 27B), and a trick-play area TPA is located in a corresponding portion of track A. Therefore, the trick-play areas are entirely reproduced by heads opposed 180° apart and by heads adjacent to one another.

FIGS. 28A and 28B illustrate an example of the locations of trick-play areas on even and odd tracks, respectively, in which the maximum reproducing speed is 17 times normal speed, the inter-gap distance of a double-azimuth head arrangement (i.e., adjacent heads) is five sync blocks, and the size of each trick-play area is 4 sync blocks. As indicated in FIG. 28A, each even numbered track has 6 trick-play areas 0 to 5 located at sync block nos. 27–30, 50–53, 73–76, 97–99, 120–123, and 143–146, respectively. As indicated in FIG. 28B, each odd numbered track has 6 trick-play areas 0 to 5 located at sync block nos. 22–25, 45–48, 68–71, 92–94, 115–118, and 138–141, respectively.

FIG. 29 provides a summary of the forward and reverse tape reproducing speeds when the maximum reproducing speed is 17 times the standard reproducing speed. As shown, a drum configuration of two heads disposed 180° apart and which rotates at 9000 rpm or a drum configuration of a pair of double-azimuth (adjacent) heads and which rotates at 9000 rpm can reproduce the trick-play data at speeds of 1.5, 2.5 ... 8.5 and 17 times the normal reproducing speed and reverse speeds of −1.5, 2.5, ... −8.5, and −17 times the normal reproducing speed. A drum configuration of two pairs of double-azimuth heads and which rotates at 4500 rpm can reproduce the trick-play data at speeds of 1.5, 2.5 ... and 8.5 times the normal reproducing speed and reverse speeds of −1.5, 2.5, ... and −8.5 times the normal reproducing speed. It is to be noted that the inter-gap distance limitation at the maximum speed is 5 sync blocks, but not at other speeds.

When the trick-play areas on each track occupy 32 sync blocks and the same trick-play data (HP packet data) is recorded on 17 tracks, the rate of recording the same HP packet data on 17 tracks is 339 kbps (kilobytes per second), as derived from the following equation:

$$\frac{32 \text{ sb}}{\text{track}} \times \frac{75 \text{ bytes}}{\text{sb}} \times \frac{8 \text{ bits}}{\text{bytes}} \times \frac{10 \text{ tracks}}{\text{frame}} \times \frac{30 \text{ frames}}{\text{second}} \times \frac{1}{17} = 339 \text{ kbps}$$

sb = sync block

The average rate of I-frame data which is supplied to the digital VTR of the present invention is calculated from the GOP arrangement of the data (see FIG. 2) and the data rate of the video data supplied to the digital VTR. When GOP= (N=9, M=3) (i.e., 1 I-frame, 2 P-frames and 6 B-frames are supplied), the average amount of data of I, P and B-frames is: I/P=2, and P/B=2.5 (I/B=5), and the rate of the entire video data is 17.4 Mbps, then the average rate of I-frame data is:

$$17.4 \text{ Mbps} \times \frac{\text{amount of data in } I\text{-frame}}{\text{total amount of data in } I, P \text{ and } B \text{ frames}} =$$

$$17.4 \text{ Mbps} \times 5/(5 \times 1 + 2.5 \times 2 + 1 \times 6) = 5.4 \text{ Mbps}.$$

It is to be noted that the data rate is dependent not only the rate of the entire bit stream, the GOP arrangement, and the average amount of data of each frame, but is also dependent upon other factors, such as the nature of the input image, etc.

As indicated by the rate of recording HP packet data on each of 17 tracks which is approximately 339 kbps and the average data rate of each I-frame which is approximately 5.4 Mbps, it is not possible to store the entire I-frame in the trick-play areas of each track. Therefore, only the low-band coefficients of each I-frame is stored in the trick-play areas of each track, as previously discussed.

Figure 30:
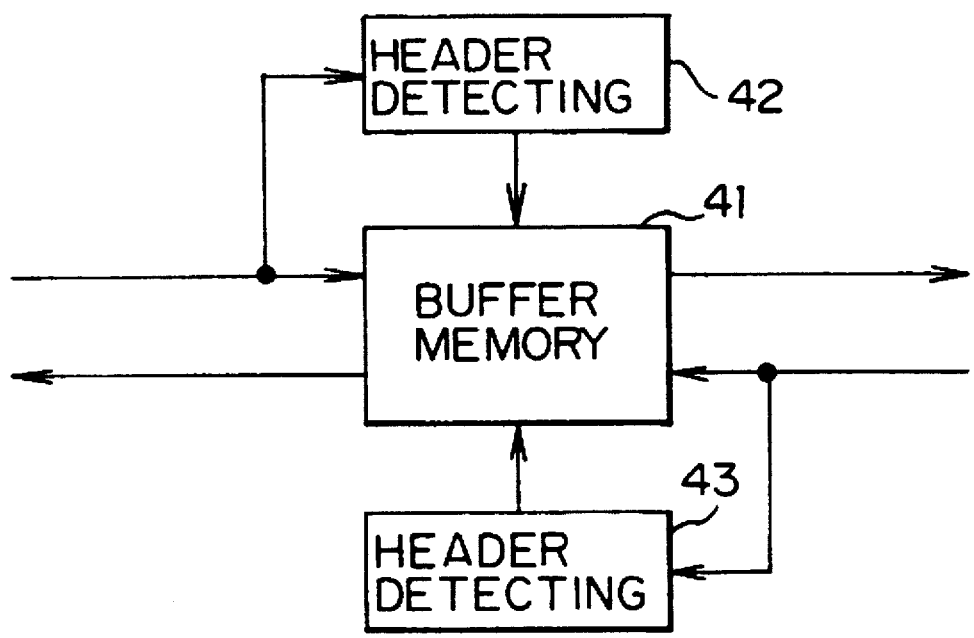
FIG. 30 is a block diagram of the reproducing portion having a buffer memory in accordance with the present invention.

FIG. 30 illustrates a preferred embodiment of the present invention in which a buffer memory 41 is included in the reproducing circuit of the present invention for buffering the reproduced data before it supplied to decoder 7 (FIG. 6). As previously described, reproduced signals in variable and high-speed reproducing modes are in the form of burst signals which are supplied to decoder 7, and although the low-band coefficients of an I-frame are recorded in the trick-play areas of each track, there is no guarantee that the time of displaying the reproduced image (1/30 second) will match the time at which the I-fame is reproduced and supplied to decoder 7. In this instance, only a portion of an image may be renewed (i.e., updated) in a variable or high-speed reproducing mode. Therefore, data is buffered in buffer memory 51 when it is reproduced, and it is supplied to the decoder only after a sufficient amount of data is buffered in buffer memory 41 which corresponds to an complete single image (i.e., frame). In addition, the buffer memory may also be utilized during recording of trick-play data in the trick-play areas of each track.

As shown, buffer memory 41 is supplied with all of the data to be recorded in the trick-play areas of each track, and supplies the buffered data to the recording circuits in response to a detection signal from a header detecting circuit 42 which detects each header of the data to be recorded. During reproduction, buffer memory 41 is supplied with all of the data reproduced from the trick-play areas of each track and supplies the data out to decoder 7 in response to a control signal from header detecting circuit 43 which detects the header of each I-frame in the reproduced data.

Figure 31:
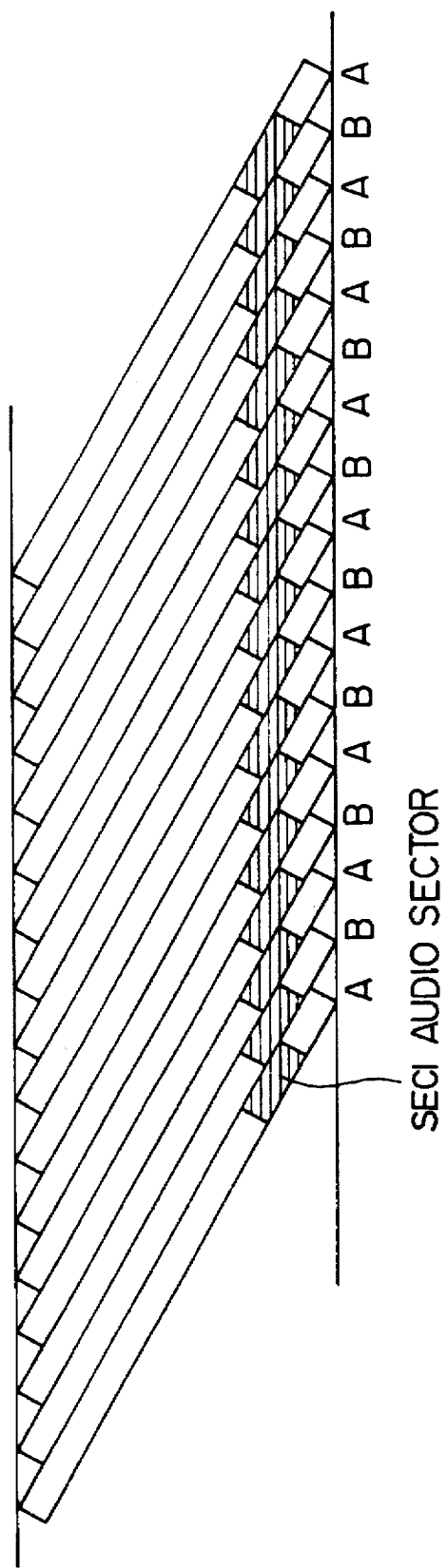
FIG. 31 is a schematic illustration of tracks recorded on a magnetic tape medium in which the trick-play areas are located in the audio sectors of each track in accordance with the present invention.

FIG. 31 illustrates another embodiment of the present invention in which all of the trick-play areas are located in the audio sectors SEC1 of each track. As previously described, each track includes an audio area (sector) SEC1, a video area SEC2 and a subcode area SEC3 (FIG. 9). In this embodiment, all of the video and audio data are recorded in the video area of each track and all of the trick-play data is recorded in the audio area of each track. Similar to the above described embodiments, the maximum reproducing speed M=(2N+1) times the standard reproducing speed and the same trick-play data is stored on M tracks. Then, upon reproduction in variable or high-speed modes, the audio sector SEC1 can be reproduced at M times the standard speed, and also at speeds of 1.5, 2.5 . . . N+0.5 times the standard speed. Therefore, trick-play areas do not have to be located in the video area of each track.

While the present invention has been particularly shown and described in conjunction with preferred embodiments thereof, it will be readily appreciated by those of ordinary skill in the art that various changes and modifications may be made without departing from the spirit and scope of the invention. For example, although data structures of different parts of the video data have been described, the present invention is not limited to these structures and may utilize other data structures consistent with the present invention.

As another example, although reproducing speeds of 17, 9, 5 and 4 times the standard reproducing speed have been described, the present invention is not limited solely to these reproducing speeds and may be widely applied to recording data for reproduction at any essentially any desired reproducing speed or speeds.

Therefore, it is intended that the appended claims be interpreted as including the embodiments described herein, the alternatives mentioned above, and all equivalents thereto.

What is claimed is:

1. Apparatus for recording digital video data on a record medium, comprising:

means for receiving digital video data;

means for providing a portion of said digital video data corresponding to a frame as variable-speed data; and recording means for recording said digital video data and said variable-speed data in a main and a marginal area, respectively, of successive tracks on said record medium, said marginal area being located on each of said tracks at a position corresponding to an area of a track which is reproducible in a fast-speed reproducing mode, said record medium being transportable in said fast-speed reproducing mode at a predetermined fast speed greater than a standard speed, said fast speed being an integer multiple M times faster than said standard speed, and said recording means being operable to record the same variable-speed data in said marginal area of M tracks on said record medium.

2. The apparatus of claim 1, wherein said digital video data includes intra-coded frame data, predictive coded frame data, and bidirectionally predictive coded frame data, and said means for providing is operable to provide said intra-coded frame data of said digital video data as said variable-speed data.

3. The apparatus of claim 2, wherein said intra-coded frame data includes low-band coefficient data and high-band coefficient data, and said means for providing is operable to provide said low-band coefficient data of said intra-coded frame data as said variable-speed data.

4. The apparatus of claim 1, wherein said marginal area of each of said tracks includes a plurality of trick-play areas each for storing a portion of said variable-speed data.

5. The apparatus of claim 4, wherein said trick-play areas are located on each of said tracks at positions corresponding to all areas of a track which may be scanned during reproduction in said fast-speed reproducing mode such that at least one of said trick-play areas of each track is reproduced in said fast-speed reproducing mode.

6. The apparatus of claim 5, wherein said recording means is operable to record the same portion of said variable-speed data in respective trick-play areas on each of said M tracks such that substantially every portion of said variable-speed data is reproduced after one scan of said tracks during reproduction in said fast-speed reproducing mode.

7. The apparatus of claim 6, wherein said integer multiple M is an odd number, and substantially every portion of said variable-speed data is reproduced after two scans of said tracks in each of a plurality of variable-speed reproducing modes, said record medium in said variable-speed reproducing modes being transported at respective constant speeds equal to L+0.5 times faster than said standard speed, L being an integer value from 1 to N and N=(M−1)/2.

8. The apparatus of claim 7, wherein said recording means includes first and second heads for recording alternating tracks having first and second azimuths, respectively, such that substantially all of said variable-speed data recorded in each track having said first azimuth is reproduced in two scans of said tracks by said first head in each of said variable-speed reproducing modes.

9. The apparatus of claim 4, wherein said recording means includes two recording heads having a gap distance therebetween and being operable to record said trick-play areas at positions on each of said tracks in accordance with said gap distance of said two recording heads.

10. The apparatus of claim 4, wherein said recording means is operable to record said trick-play areas at positions on each of said tracks such that at least one of said trick-play areas of each track is reproducible in said fast-speed reproducing mode by a pair of reproducing heads opposed 180° apart from one another and by adjacently positioned reproducing heads.

11. The apparatus of claim 1, wherein each track includes a video area, an audio area and a subcode area, said marginal area of each track being located primarily in said audio area.

12. The apparatus of claim 1, wherein said digital video data is an advanced television (ATV) type signal.

13. Apparatus for reproducing digital video data from successive tracks on a record medium, each track on said record medium having a main area in which digital video data is stored and a marginal area in which a portion of said digital video data corresponding to a frame is stored as variable-speed data, the same variable-speed data being stored on each of M tracks, and said apparatus being operable in a standard reproducing mode and a fast-speed reproducing mode, said apparatus comprising:

transporting means for transporting said record medium at a standard speed in said standard reproducing mode and at a substantially constant fast speed in said fast-speed reproducing mode, said fast speed being M times faster than said standard speed;

reproducing means for reproducing said digital video data and said variable-speed data from said main and marginal areas, respectively, of each track on said record medium in said standard reproducing mode, and for reproducing said variable-speed data from said marginal area of each track in said fast-speed reproducing mode; and wherein said reproducing means scans one track in one scan Bass in said standard reproducing mode, and is operable to reproduce substantially all of said variable-speed data in one scan pass of said tracks in said fast-speed reproducing mode; and supply means for supplying said reproduced digital video data as an output in said standard reproducing mode, and for supplying said reproduced variable-speed data as said output in said fast-speed reproducing mode.

14. The apparatus of claim 13, wherein said digital video data includes intra-coded frame data, predictive coded frame data, and bidirectionally predictive coded frame data, and said intra-coded frame data of said digital video data is stored in said marginal area of each track as said variable-speed data.

15. The apparatus of claim 13, wherein said marginal area of each of said tracks includes a plurality of trick-play areas and a portion of said variable-speed data is stored in each of said trick-play areas.

16. The apparatus of claim 15, wherein said trick-play areas are located on each track at reproducible positions in said fast-speed reproducing mode, and said reproducing means is operable to reproduce data stored in at least one of said trick-play areas of each track in said fast-speed reproducing mode.

17. The apparatus of claim 16, wherein the same portion of said variable-speed data is stored in respective trick-play areas on each of said M tracks.

18. The apparatus of claim 17, wherein said integer multiple M is an odd number; wherein said transporting means is operable in a plurality of variable-speed reproducing modes to transport said record medium at respective constant speeds equal to L+0.5 times faster than said standard speed, L being an integer value from 1 to N, with N=(M−1)/2; and wherein said reproducing means is operable to reproduce substantially every portion of said variable-speed data in two scan passes of said tracks in each of said variable-speed reproducing modes.

19. The apparatus of claim 18, wherein said successive tracks have alternating first and second azimuths, and said reproducing means includes first and second heads for scanning tracks having said first and second azimuths, respectively, and is operable to reproduce substantially all of said variable-speed data stored in each track having said first azimuth in two scans of said tracks by said first head in each of said variable-speed reproducing modes.

20. The apparatus of claim 17, wherein said transporting means is operable to transport said record medium in reverse at a reverse speed equal to M−2 times faster than said standard speed in a reverse fast-speed mode, and said reproducing means is operable to reproduce substantially every portion of said variable-speed data in one scan pass of said tracks in said reverse fast-speed mode.

21. The apparatus of claim 13, wherein said digital video data is an advanced television (ATV) type signal.

22. The apparatus of claim 13, further comprising accumulating means for accumulating said variable-speed data reproduced by said reproducing means, and wherein said supply means is operable to supply said variable-speed data accumulated only when a predetermined amount of data is accumulated in said accumulating means.

* * * * *